Patented Mar. 30, 1954

2,673,828

UNITED STATES PATENT OFFICE 2,673,828

PREPARATION AND USE OF POLYSACCHARIDE-PRODUCING ENZYME

Harold J. Koepsell, Anna Kazenko, and Allene R. Jeanes, Peoria, Eugene S. Sharpe, Eureka, and Carl A. Wilham, Peoria, Ill., assignors to the United States of America as represented by the Secretary of Agriculture No Drawing. Application March 14, 1951,
Serial No. 215,623

8 Claims. (Cl. 195—66)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the production of enzymes and enzyme preparations suitable for use in converting carbohydrate materials, such as sucrose, to high molecular weight polysaccharides. It relates more particularly to the production of dextran- and levan-producing enzymes and the subsequent utilization of the enzymes in converting sucrose to dextran and levan.

High molecular weight polysaccharides, such as levan and dextran, are produced by the action of certain microorganisms upon substrates containing sucrose. Dextran, being a polysaccharide composed of anhydro-glucose units, is synthesized using the anhydro-glucose portion of the sucrose molecule. Levan, on the other hand, being composed of anhydro-fructose units is synthesized from the fructose portion of the sucrose molecule. Prior workers have learned that the synthesis of both levan and dextran is the result of enzyme action. The necessary enzyme systems are produced by the microorganism in the culture medium, and the synthesis of the polysaccharide occurs simultaneously with the life processes of the organism, both processes being more or less independent of each other.

Dextran and levan are known to be produced by a wide variety of microorganisms. Some microorganisms are capable of producing mixtures of both polysaccharides at the same time. In this application the terms "dextran-producing microorganism" and "levan-producing microorganism" refer to those organisms of the genera Acetobacter, Leuconostoc, Aerobacter, Streptobacterium, Betabacterium, Bacillus, Lactobacillus, Streptococcus, and the like, known to produce the polysaccharides in question or mixtures thereof in aqueous culture media containing sucrose, dextrin, and the like.

The production of substantial quantities of these two polysaccharides in the past has involved the whole-culture fermentation of the polysaccharide-producing organism on culture media containing 5 to 10 percent sucrose or dextrin together with the nutrients required by the organism in its growth. The products of this whole-culture procedure are viscous in character, and the desired polysaccharide is admixed with bacterial cells, extraneous metabolic products and other impurities, thus rendering isolation of any of the constituents quite difficult. This prior method of production, moreover, involves a complexity of variables which render the overall process difficult to control and which render the overall result relatively unpredictable as to yield and quality.

Prior workers have indicated that the enzyme systems responsible for the synthesis of these polysaccharides are extracellular in character, and several attempts have been made to produce the isolated enzymes in a form which would be satisfactory for cell-free enzyme synthesis. Despite the inherent advantages which such a synthesis would possess, these prior attempts have been unsuccessful in effecting methods which would compete with whole-culture methods for producing the polysaccharides. Much difficulty has been encountered in separating the enzyme product from the other constituents of these prior culture media, and elaborate laboratory methods have been devised to accomplish this. Even so, enzymes isolated by prior methods have been very inferior in potency.

We have discovered that the polysaccharide-producing organism, i. e., one capable of producing dextran, levan, or mixtures thereof, may be cultured under conditions which will result in a maximum production of recoverable enzyme accompanied by a minimum of polysaccharide production. The culture liquors thus obtained are thin and nonviscous and may be readily treated to separate the cells, to precipitate or otherwise isolate the enzyme, or to be purified as described in the following specification. The cell-free culture liquors containing the enzyme, or the isolated or purified enzyme itself, may then be utilized to synthesize the desired polysaccharide.

Our invention is based upon our discovery that polysaccharide-producing organisms follow a remarkable behavior pattern when fed limited amounts of sucrose. When the amount of sucrose is kept below a critical value, it is metabolized by the organism, substantially the whole amount being utilized for cell growth and practically none being utilized for polysaccharide synthesis.

When the cell growth has been established, the cells secrete copious quantities of polysaccharide-producing enzyme into the surrounding medium, even though there may be but a trace of sugar present. Thus, we have discovered a peculiar set of conditions under which optimum production of isolable enzyme may be realized. This optimum is not necessarily concomitant with maximum cell production but is characterized by minimum accumulation of substances which cause increase in viscosity of the medium. This discovery has led us to a practical method for producing polysaccharide-producing enzymes in a medium from which they are readily isolable, being relatively free from admixture with extraneous metabolic products, and in which they are preserved in an uninactivated state.

According to our invention, a dextran-producing organism, or levan-producing organism, is cultured in a medium containing a minimum amount of sucrose. We employ only that amount of sucrose necessary to support the reproduction of the organism plus a slight excess. Our media, therefore, contain only from ½ to 2 percent sucrose. To the culture medium we also supply the known nitrogen and other nutrient materials required by the organism in question.

The fermentation time is generally 24 to 48 hours, but may be shorter or longer in specific instances. A convenient practical end point is that time when substantially all the sucrose in the culture medium has just been used up. The end point may be determined more accurately, however, by assay of the culture liquor for peak enzyme content. These two end points usually coincide, but not in every case. Enzyme assay may be made by determining the amount of reducing sugar produced by a portion of the enzyme liquor acting on sucrose.

The cell-free culture liquor containing the separated enzyme may be used as the sucrose conversion medium, or we may recover and isolate the enzyme by precipitation, as for example, adjusting the pH to 6.0 to 7.5. At this acidity a flocculent precipitate forms which contains the enzyme. The cell-free liquor or the precipitate may be stored, if desired, or may be used immediately for sucrose conversion. If the cell-free filtrate is used as the conversion medium, the conversion may be accomplished merely by adding sucrose up to 5 to 10 percent and permitting the enzyme action to proceed. On the other hand, the precipitate may be dissolved in water at about pH 5 to 5.5, and this solution added to a sucrose solution of proper concentration to make the final sugar content 5 to 10 percent.

Our invention is attended by numerous advantages. By separating the production of the enzyme as a step more or less independent of the subsequent synthesis of the polysaccharide, we are frequently able to realize an overall reduction in time. For example, prior methods have been limited by the physical conditions required by the organism; whereas, in our process we may vary the time, temperature, pH, etc., of the polysaccharide synthesis step over very wide ranges.

Also, our process results in a more uniform "crude" or first product, uncontaminated by bacterial cells and being reproducible from lot to lot. We do not need to risk relatively large amounts of sucrose until after successful polysaccharide synthesis is assured. This is a distinct economic advantage, for prior methods frequently result in failures and those failures inevitably involve the loss of the considerable amounts of sucrose in the culture liquor.

By our invention it is easier to achieve and maintain aseptic conditions because of the reduced volumes and reduced complexities of inoculation and culture medium handling. Also, because of the higher purity of our conversion liquors the recovery of residual monosaccharide, i. e., fructose in the case of dextran synthesis, and glucose in the case of levan synthesis, is greatly simplified.

In the use of our separated enzyme we realize the advantages enumerated previously. The conditions of conversion, i. e., the temperature and pH may be varied as desired to increase yields of polysaccharide or to affect its polymerization. For example, we have discovered that an increase in yield and decrease in time are gained if the polymerization is carried out at temperatures above 20° C., for example 25° to 35° C. However, satisfactory conversions may be accomplished within the range of 15° to 40° C.

The following specific examples illustrate the invention.

Example 1

*Leuconostoc mesenteroides* NRRL B-512 was inoculated into a sterile medium of the following composition:

| | |
|---|---|
| Commercial granulated sucrose___percent__ | 2 |
| Yeast extract_____do_____ | 0.5 |
| Tryptone _____do_____ | 0.5 |
| Monobasic potassium phosphate____do_____ | 0.1 |
| Anhydrous magnesium sulfate_____do_____ | 0.03 |
| Fe as ferrous ammonium sulfate__p. p. m__ | 1 |

Several 1-liter Erlenmeyer flasks containing 200 ml. of the above medium were incubated with continuous shaking for 48 hrs. at 28° C. At the end of this period the cultures were heavy with cell growth but were water-thin in consistency. The cells were removed by centrifuging on a supercentrifuge. The resulting liquors were pale yellow and clear except for a very slight opalescence. No cells could be detected. The pH was 5.6. The enzyme-containing liquor was capable of utilizing 30 mg. of sucrose per ml. per hr. at 30° C. in 10 percent sucrose solution in M/20, pH 5.0 acetate buffer as measured by reducing power. These liquors, after the addition of a small volume of toluene as preservative, retain potent dextran synthesizing ability for several months if kept refrigerated.

Two hundred fifty ml. of the liquor was adjusted to pH 5.0 and 25.0 g. of sucrose was added. The resulting solution was held at 30° C. for 16 hrs. Analysis showed that 14.7 g. of reducing sugars, calculated as fructose, had been produced. Sufficient ethanol to make 50 percent by volume was added, whereupon dextran precipitated as a gum. It was reprecipitated several times from 50 percent ethanol and finally obtained as a dry floc out of absolute ethanol. The yield on a dry weight basis was 8.9 g.

Example 2

A second portion of the centrifuge culture liquor of Example 1 was used for dextran synthesis in the same manner, except that the dextran-synthesizing reaction mixture was maintained at 20° C. The yield was 8.2 g. of dry dextran.

Example 3

Leuconostoc mesenteroides NRRL B-512 was inoculated into 15 l. of sterile medium having the following composition:

| | | |
|---|---|---|
| Sucrose | percent | 2 |
| Corn steep liquor solids | do | 0.07 |
| Ammonium sulfate | do | 0.17 |
| Monobasic potassium phosphate | do | 0.17 |
| Anhydrous magnesium sulfate | do | 0.03 |
| Fe as ferrous ammonium sulfate | p. p. m. | 1 |
| Calcium carbonate | percent | 1.0 |

The culture was incubated at 27° C. in a 5-gal. container with occasional shaking for 36 hrs. At the end of this period the culture was nonviscous and showed no tendency to foam when shaken. Bacterial cells and other solids were removed on a supercentrifuge, yielding 14.5 l. of slightly opalescent, amber liquor of pH 5.3.

Sucrose, 1,320 g. was added to 13.2 l. of this liquor, the pH adjusted to 5.8, and the solution maintained at 20° C. It soon became viscous and highly opalescent. At the end of 70 hrs., analysis showed that 740 g. of reducing sugars, calculated as either fructose or glucose, had been produced. Dextran was precipitated with 50 percent ethanol and reprecipitated several times in the same manner with 50 percent ethanol, and finally isolated as a white flocculent precipitate from absolute ethanol. The yield of dry dextran from 9.1 liters of the reaction mixture was 190 g. The product gave a negative test for fructose.

The supernatant liquor remaining after precipitation of the dextran was treated with sufficient additional ethanol to bring the concentration to about 60 percent. A flocculent precipitate appeared and was reprecipitated from 55–60 percent ethanol. A dry white flocculent material was obtained by precipitating from absolute ethanol. The substance, levan, gave strong tests for fructose, and hydrolyzed in N/1 HCl at 100° C. in 10 minutes to give the theoretical reducing sugar value. The yield was 93 g. on a dry basis.

Example 4

Leuconostoc mesenteroides NRRL B-1119 was grown on the medium and under the conditions of Examples 1. A thin, pale yellow and only slightly opalescent liquor, free of cells, was obtained on centrifuging the culture. To 740 ml. of the centrifuged liquor, adjusted to pH 5.10, was added 74 g. of sucrose. The reaction mixture was held at room temperature for 48 hrs. Dextran was isolated as in Example 1. The yield was 23.5 g. of dry dextran.

Example 5

Leuconostoc mesenteroides NRRL B—1120 was grown for 40 hrs. in the medium and under the conditions described in Example 1, except that in this example 800 ml. of the medium was cultured in a 1-liter Erlenmeyer flask, the culture being shaken only occasionally during incubation. The liquor obtained on centrifugation was cell free and almost clear. A 200-ml. portion of the liquor was adjusted to pH 7.5 with N/10 sodium hydroxide solution. A flocculent precipitate appeared. The suspension was centrifuged, and the supernatant liquor separated. The precipitate was taken up in 200 ml. of cold water and the pH adjusted to 5.5 with dilute HCl. The solution obtained was water white, perfectly clear, contained no precipitate, and was not opalescent. Twenty-five grams of sucrose was added, and the solution was held at 30° C. It soon became opalescent and set into a gel. Dextran was isolated at the end of 22 hrs. in the manner previously described, yield on a dry basis, 7.1 g.

Example 6

Leuconostoc mesenteroides NRRL B-1120 was grown as in Example 1, excepting that the sucrose content of the medium was 0.5, 1.0 and 2.0 percent in separate flasks. The cultures were centrifuged at the end of 16 hrs. Sucrose, 1.0 gram, was added to 10 ml. of each liquor. Each reaction mixture soon became highly opalescent and viscous, and had set into a thick gel in 24 hrs. Analysis indicated that about 42 mg. of reducing sugar had been produced per ml. of each solution, and the addition of an equal volume of alcohol produced a heavy, gummy precipitate of dextran in each instance.

We claim:

1. The method of producing polysaccharide-producing enzyme comprising culturing bacteria capable of producing one of the group consisting of dextran, levan, and mixtures thereof, in a nutrient medium comprising ½ to 2 percent sucrose, continuing fermentation until substantially all of the sucrose is used up and separating the bacterial cells from the culture medium.

2. The method of producing polysaccharide-producing enzyme comprising culturing Leuconostoc mesenteroides from a culture medium comprising ½ to 2 percent sucrose, continuing fermentation until substantially all the sucrose is used up, separating the bacterial cells from the culture medium by centrifugation.

3. The method of producing polysaccharide-producing enzyme of claim 3 wherein the pH of the cell-free culture medium containing polysaccharide-synthesizing enzyme is adjusted within the range of 6 to 7.5 whereby a flocculent precipitate is formed and separating the precipitate.

4. The method of producing polysaccharide-producing enzyme comprising culturing bacteria normally producing one of the group consisting of dextran, levan, and mixtures thereof, in a nutrient medium comprising ½ to 2 percent sucrose, recovering polysaccharide-producing enzyme from the culture liquor by a method comprising separation of the bacterial cells, and subsequently subjecting a 5 to 10 percent aqueous solution of sucrose to the action of the recovered enzyme solution.

5. The method of producing polysaccharide-producing enzyme comprising culturing bacteria capable of producing one of the group consisting of dextran, levan, and mixtures thereof, in a nutrient medium comprising ½ to 2 percent sucrose, continuing fermentation until substantially all of the sucrose is used up, separating the bacterial cells from the culture medium, adding 5 to 10 percent sucrose to the cell-free culture medium containing polysaccharide-synthesizing enzyme and maintaining the resulting solution whereby one of the group consisting of dextran, levan, and mixtures thereof is formed and recovering the same from the solution.

6. The method of producing polysaccharide-producing enzyme comprising culturing bacteria normally producing a carbohydrate gum in a nutrient medium comprising ½ to 2 percent sucrose and separating the bacterial cells from the nutrient medium.

7. The method of producing enzyme material capable of synthesizing a carbohydrate gum from sucrose comprising culturing carbohydrate gum-forming bacteria of the genera of the group consisting of Acetobacter, Leuconostoc, Aerobacter, Streptobacterium, Betabacterium, Bacillus, Lactobacillus and Streptococcus in a nutrient medium comprising ½ to 2 percent sucrose as the essential source of assimilable carbon and a source of assimilable nitrogen, continuing cultivation until the culture liquor contains substantial amounts of said enzyme material as measured by the ability of the culture liquor to produce reducing sugar when acting on sucrose, and separating the bacterial cells from the culture liquor containing said enzyme material.

8. The method of claim 7 in which the gum-forming bacteria is of the genus Leuconostoc.

HAROLD J. KOEPSELL.
ANNA KAZENKO.
ALLENE R. JEANES.
EUGENE S. SHARPE.
CARL A. WILHAM.

References Cited in the file of this patent

UNITED STATES PATENTS

| Number | Name | Date |
|---|---|---|
| 2,392,258 | Owen | Jan. 1, 1946 |

OTHER REFERENCES

Evans et al., Bacterial Polysaccharides (reprint from advertisement in Carbohydrate Chemistry, vol. II, Academic Press), Scientific Report Series, No. 6, Sugar Research Foundation, Inc., N. Y., April 1947, article pages 203–233; pages 211, 216–17 relied upon.

Hehre et al., Jour. Bact. 55., 55 (1948), pages 197–208; pages specifically relied upon are 204–5.